United States Patent [19]

Liebson

[11] Patent Number: 5,485,012
[45] Date of Patent: Jan. 16, 1996

[54] METHOD AND APPARATUS FOR BLIND OPTICAL AUGMENTATION

[75] Inventor: Wilbur Liebson, Springfield, Va.

[73] Assignee: The United States of America as represented by the Secretary of the Army, Washington, D.C.

[21] Appl. No.: 926,976

[22] Filed: Jul. 18, 1978

[51] Int. Cl.[6] .............................. G01J 5/00; G02F 1/00; G02B 23/00
[52] U.S. Cl. .................... 250/339.06; 250/330; 250/342; 359/407; 359/436; 359/480
[58] Field of Search ............................... 350/36, 145, 10; 250/332–334, 330, 339, 342, 346, 347, 352, 341, 213 VT; 358/113; 356/1, 4, 5, 141, 152

[56] References Cited

U.S. PATENT DOCUMENTS

| | | | |
|---|---|---|---|
| 3,173,012 | 3/1965 | Winter | 250/333 |
| 3,478,212 | 11/1969 | Turck | 250/339 |
| 3,535,043 | 10/1970 | Hong | 350/10 |
| 3,781,560 | 12/1973 | DeBurgh et al. | 350/36 |
| 3,968,456 | 7/1976 | Welch | 250/199 |
| 4,037,921 | 7/1977 | Cox | 350/36 |
| 4,091,412 | 5/1978 | Salonimer | 358/113 |

FOREIGN PATENT DOCUMENTS

| | | | |
|---|---|---|---|
| 485999 | 3/1970 | Switzerland | 350/10 |
| 3650 | of 1899 | United Kingdom | 350/10 |

*Primary Examiner*—Stephen C. Buczinski
*Attorney, Agent, or Firm*—Milton W. Lee; John E. Holford; Anthony T. Lane

[57] ABSTRACT

A support-measure to pinpoint and neutralize electro-optical viewing devices or systems is provided which utilizes blind optical augmentation. The counter-measure uses a light source to which current viewers are blind and a combination of visible and far infrared viewing or detection devices.

3 Claims, 1 Drawing Sheet

METHOD AND APPARATUS FOR BLIND OPTICAL AUGMENTATION

The invention described herein may be manufactured, used, and licensed by the U.S. Government for governmental purposes without the payment of any royalties thereon.

BACKGROUND OF THE INVENTION

There has been and still is a great amount of research involving surveillance at night and through camouflage in battlefield situations. This has led to the development of two distinct classes of optical devices known as image intensifiers and thermal viewers. The former make use of ambient skylight from the moon, stars or any low intensity sources of opportunity that happen to be near a target. The latter relies on blackbody radiation from the target itself or the deficiency thereof as compared with the ambient level of background radiation. Both devices rely rather heavily on the use of large apertures and associated precision optics to focus all of the light admitted by the aperture. The image intensifier also utilizes a broadband detector, i.e. one having a bandwidth greater than the human eye. The remaining intensification required for comfortable viewing is achieved by an electronic amplification of the signal supplied by the detector in these devices. The thermal viewer operates in a similar manner, but the detector is generally more sophisticated and operates entirely in the far-infrared region of the electromagnetic spectrum. Room temperature detectors are available, but high performance systems, i.e. large area high resolution types, still require special detector arrays with cooling (usually to the temperature of liquid nitrogen or less).

Even though these viewing devices are passive in nature, there has always been a concern that they might be spotted as targets by the enemy. Various designs have been devised to blend them into their background environments, but the optics must necessarily be exposed while such a device is in use. This leaves the device vulnerable to a support-measure employing a technique known as optical augmentation. This technique utilizes a hostile optical viewing system in the same manner as a corner reflector. A narrow beam of collimated light is directed into the optical system and becomes focussed on the first opaque surface encountered, usually the detector. A certain amount of the beam is also reflected from each transparent surface encountered. Light reflected from these surfaces tends to become refocussed into a beam directed back to the original beam source. A detector located at the source can then detect the presence of the viewer from the direction and intensity of the return beam relative to the beam transmitted.

The support-measure itself, however, has some serious drawbacks. Since the optical system should only be exposed while the viewing system is in operation, there is the definite possibility that the detector in the hostile viewer will pinpoint the collimated beam source, at least compromising its presence and inviting the destruction of the source and/or its operator. This is made even more hazardous if one assumes that both of the detectors involved are at least equally sensitive. Under these conditions the hostile detector will have at least twice the range of the support-measure detector.

BRIEF DESCRIPTION OF THE INVENTION

It is, therefore, an object of the present invention to provide a support-measure method and apparatus for use against optical viewers, which utilizes optical augmentation without subjecting the apparatus or its operator to almost sure compromise. The above is accomplished through a technique which takes advantage of an inherent limitation of current viewers in the field, i.e. the fact that their optical systems are more broadband than their detectors. This technique has been called Blind Optical Augmentation (BOA).

BRIEF DESCRIPTION OF THE DRAWINGS

The invention is best understood with reference to the accompanying drawings wherein.

DESCRIPTION OF THE INVENTION

Figure 1:
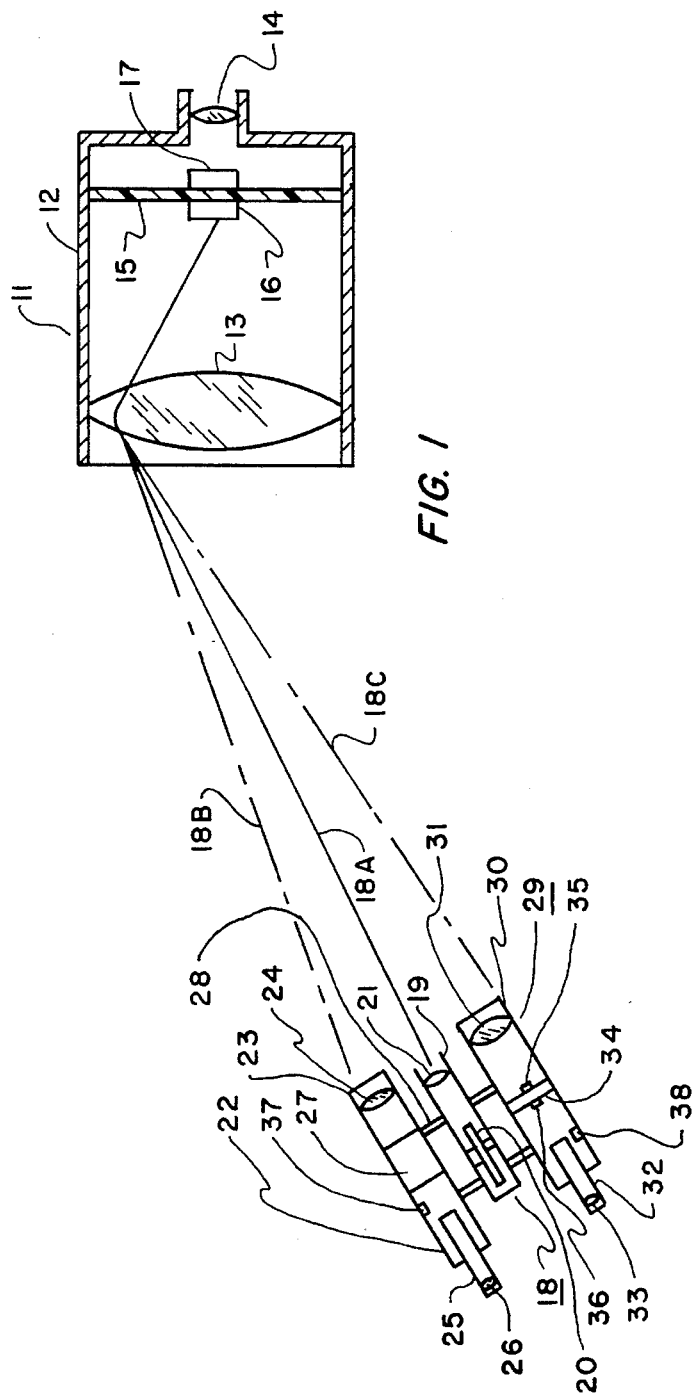
FIG. 1 shows a cutaway view of a hostile viewing system being illuminated with a BOA system according to the present disclosure.
Figure 4:
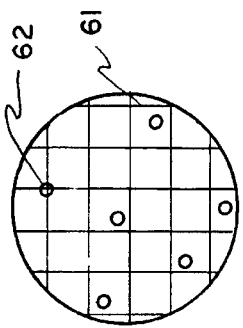
FIG. 4 shows a composite view of FIGS. 2 and 3 as seen by the above operator when using both eyes simultaneously.

Referring again to FIG. 1 there is shown a typical hostile viewing system 11. The term hostile as used herein refers not only to a military device belonging to an enemy, but any optical detection device whose presence is to be determined without activating the detector thereof. Such a device will generally include a housing 12 fitted with an objective lens 13 of either the refracting or the reflecting type. It may include an eyepiece 14 to view the image formed by the objective lens. It may also include a substrate 15 such as a microchannel plate or a pc board with their usual circuitry and power supplies (not shown). In this latter case a detector 16 will be mounted on the objective lens side of the substrate in the plane of the image formed by the objective lens and may consist of a photocathode, photodiode, pyroelectric wafer, or the like. With these types of detectors there will be a converter 17 on the opposite side of the substrate in the image plane of the eyepiece, if such is present, to convert the image formed by the detector (which is usually in some electronic form) into a visible image or a TV type signal which can easily be converted to a visible image at some remote location.

Of particular interest in the present invention is the structure of the objective lens system 13 and the detector 16. The objective lens will generally consist of a number of elements, each of which will produce a certain degree of reflection, as will the detector. To minimize this the objective lens is usually made from a material which passes the frequencies of light to which the detector is most sensitive with the least attenuation. For example, in thermal viewers operating at 3 to 5 micron wavelengths the lenses are made having from germanium, IRTRAN and the like, which rejects visible light, but passes far-infrared light wavelengths between 0.5 and 10 microns. To improve the efficiency the lens elements and the detector may be coated with a quarter wave anti-reflective layer. While this minimizes reflections and the bandpass of the detector, it increases reflections outside of that band. Also since photo-detectors tend to be rather inefficient devices, it is the usual practice to use materials with wide bandpass characteristics compared to the bandpass of the detector, to insure that the frequencies of interest receive the least possible attenuation.

The present invention takes advantage of this fact to detect the presence of these passive devices.

The apparatus required for the present invention is shown in FIG. 1. The basic section of the apparatus is an illuminator 18 which consists of a tubular housing 19 in which is mounted a light emitting diode, a laser or some other light source 20 which can be easily collimated. A sealing window, which may also be a collimating lens may be used at the output end of the housing, if desired. A beam of light, which is preferably narrow, but could also be adjustable to a wide angle, is directed onto the objective lens of the hostile viewer, as indicated by ray 18A. That part of the beam which enters the objective lens is partially reflected by all of the lens elements and the like through which it passes and usually to a larger degree by some opaque object like the detector or a wall of the housing. Reflections from the first surface tend to scatter and would not be of interest except when it is an antireflective coating that happens to be an odd number of half-wavelengths at the frequency of the illuminator, thereby resulting in a very large reflection. Reflections from other points along the transmission path tend to be directed back along the ray path. Actually due to the degree of unavoidable beam spreading it will return also along such divergent ray paths as 18B and 18C. The angle between the optical axes of the illuminator and the hostile viewer is exaggerated for clarity, the former must be in the field of view of the latter. To avoid detection by a hostile viewer, it is necessary to use a light frequency to which detector 16 is not sensitive. This will be discussed in more detail later in the specification.

To aim the illuminator, it is coupled in a boresighted relationship to a surveillance viewer 22, designed for use with visible, ultraviolet and/or near infrared light. This viewer consists, generally, of a tubular housing 23 containing an objective lens 24 at one end and a conventional sliding eyepiece tube 25 containing an eyepiece 26 mounted in the opposite end. For use at low light levels and at night, an image intensifier tube 27 may be mounted in the housing in the conventional manner with an external source of power (not shown). Brackets 28 connect this section and a target indicator section 29 to the illuminator. The brackets may be adjustable so that the axial spacing of the viewer section and the indicator section can be set at the interpupilary spacing of the operator, like an ordinary pair of binoculars.

The target indicator section is also boresighted with the illuminator. It, too, has a tubular housing 30, an objective lens 31, a sliding eyepiece tube 32 and an eyepiece 33, instead of an image intensifier tube, the target indicator uses a substrate 34 having an array of photodiodes 35 on the side facing the objective lens and a similar array of light emitting diodes 36 on the opposite side, to permit viewing of the return rays from the illuminator, which are preferably in the far infrared. To conserve on the number of diodes, scanning systems have been developed which use moving mirrors or even move the diodes, per se. These can be employed though they tend to make the apparatus somewhat bulkier.

Figure 3:
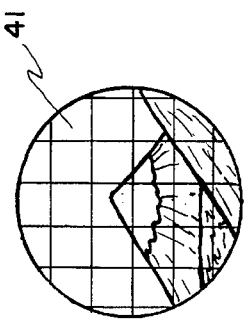
FIG. 3 shows a typical view of a plurality of devices like the hostile viewer of FIG. 1 as seen by the remaining eye of the above operator.
Figure 2:
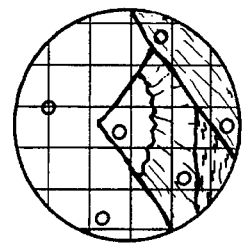
FIG. 2 shows a typical view of the background containing a hostile viewer as seen with one eye of the operator using the BOA system of FIG. 1.

The stereopsis of the operator tends to superimpose the small dots produced by returns from the illuminator in the target indicator as typlified in FIG. 3 with the scene typlified in FIG. 2, the latter appearing in the surveillance viewer. Previous attempts to accomplish this form of superposition of thermal and visual images have run into difficulties due to the operator's inability to register the vastly different image patterns. In the present invention this is overcome by superimposing a grid pattern such as pattern 41 in FIG. 2 and pattern 61 in FIG. 3 over the images. The patterns may be produced by phosphorescent ink, an edge lighted graticule, or projection type reticles 37 and 38 positioned approximately as indicated in FIG. 1. The reticle images are provided with just sufficient fine detail and/or colored backgrounds so that the operator's eyes may comfortably register them with very little obscuration of the images. The images, too, may be presented in different colors from one another and the reticle images to provide easy discrimination of the data presented.

The bandwidth of the illuminator obviously cannot lie in the visible region without being easily detected by the unaided human eye or an image intensifier. The intensifier would also pick up ultraviolet and near infrared. Thermal imagers have detectors that operate between 3 to 5 microns, where the atmosphere has a window or low attenuation for these wavelengths. There is another such window between 1.5 to 1.8 microns which seems to have been passed over in the surveillance area. Mercury-cadmium-telluride detectors will operate at wavelengths of 1.3, 1.5, 2.06 and 2.5 microns but no such systems seem to be in regular use. Apparently these would be good candidates for the present invention, as would be certain lead-sulfide detectors and many others. In summary the frequency used depends on a combination of factors which would have to be secured through counterintelligence organizations, and the like. First, the frequency must be outside the bandwidth of the detector of the hostile viewer. Second, it must be well retransmitted by that viewer's optical elements, either by a turned effect or a retrodirected effect, or both. And third, it must be conveniently radiated from a collimated source having a matching detector. Light emitting diodes and lasers are commercially available to match the detectors mentioned above, that will easily fit in the light source housing described herein. Commercial filters are also available which can be combined with the sealing window to narrow the bandwidth of the source to any region of interest.

In rare instances it might be desirable to reverse the roles of the surveillance viewer and the target indicator, i.e. when using a near visible illuminator or to use the same type of image converter in both. Other skilled in the art will immediately devise many others variations in the above apparatus and method, but the invention is to be limited only as defined in the claims which follow.

I claim:

1. An apparatus for detecting a passive viewing device in a family of optical devices with objective lenses, some of which have detectors for electromagnetic radiation in various frequency bands comprising;

a source of beamed electromagnetic radiation having an interrogation frequency corresponding to a wavelength between 1.5 and 1.8 microns;

an image intensifier coupled to and boresighted with said source to detect the ambient radiation from the background surrounding said passive viewing device; and a thermal viewer coupled to and boresighted with said source to measure the direction and magnitude of electromagnetic radiation only at said interrogation frequency reflected from said objective lenses to said source.

2. In a viewing system including an image intensifier coupled to a thermal viewer each having an image plane associated with a different one of a pair of eyepieces spaced for binocular use by a single observer, the improvement comprising:

means coupled to both said intensifier and viewer to superimpose on said image planes substantially identical visible background patterns of lines which are repetitive both horizontally and vertically.

3. A viewing system according to claim 2 wherein said pattern repeats at least five times.

* * * * *